(12) United States Patent
Pope

(10) Patent No.: US 6,270,698 B1
(45) Date of Patent: Aug. 7, 2001

(54) STRESS-RELIEVED ACRYLIC OPTICAL LENSES AND METHODS FOR MANUFACTURE BY INJECTION COINING MOLDING

(75) Inventor: Darrell Pope, Coral Springs, FL (US)

(73) Assignee: American Greetings Corp., Cleveland, OH (US)

( * ) Notice: Subject to any disclaimer, the term of this patent is extended or adjusted under 35 U.S.C. 154(b) by 0 days.

(21) Appl. No.: 09/318,396

(22) Filed: May 25, 1999

(51) Int. Cl.[7] .................................................. B29D 11/00
(52) U.S. Cl. .................... 264/2.2; 264/328.7; 264/328.8; 425/808
(58) Field of Search ........................... 264/1.1, 2.2, 40.1, 264/328.7, 328.8; 425/808

(56) References Cited

U.S. PATENT DOCUMENTS

| | | |
|---|---|---|
| 4,008,031 | 2/1977 | Weber . |
| 4,013,392 | 3/1977 | Smith . |
| 4,091,057 | 5/1978 | Weber . |
| 4,184,835 | 1/1980 | Talbot . |
| 4,249,880 | 2/1981 | Wohlrab . |
| 4,254,065 * | 3/1981 | Ratkowski ........................... 425/808 |
| 4,364,878 | 12/1982 | Laliberte, et al. . |
| 4,560,342 | 12/1985 | Ishisa, et al. . |
| 4,589,830 | 5/1986 | Clawson . |
| 4,627,952 | 12/1986 | Ophir . |
| 4,664,854 | 5/1987 | Bakalar . |
| 4,778,632 | 10/1988 | Bakalar . |
| 4,828,769 | 5/1989 | Maus, et al. . |
| 4,836,960 | 6/1989 | Spector, et al. . |
| 4,900,242 | 2/1990 | Maus, et al. . |
| 4,933,119 | 6/1990 | Weymouth, Jr. . |
| 4,959,191 | 9/1990 | Yoshioka, et al. . |
| 4,965,028 | 10/1990 | Maus, et al. . |
| 5,352,394 | 10/1994 | Fujita, et al. . |
| 5,415,817 | 5/1995 | Shiao, et al. . |
| 5,512,221 | 4/1996 | Maus, et al. . |
| 5,529,483 | 6/1996 | Abe, et al. . |
| 5,620,635 | 4/1997 | DeRozier, et al. . |
| 5,718,849 | 2/1998 | Maus, et al. . |
| 5,750,060 | 5/1998 | Maus, et al. . |
| 5,750,156 | 5/1998 | Maus, et al. . |
| 5,776,381 | 7/1998 | Haase . |
| 5,792,392 | 8/1998 | Maus, et al. . |
| 5,855,824 * | 1/1999 | Saito et al. ............................. 264/2.2 |
| 5,948,327 * | 9/1999 | Saito et al. ............................. 264/2.2 |
| 5,972,252 * | 10/1999 | Saito et al. ............................. 264/2.2 |

FOREIGN PATENT DOCUMENTS

| | | |
|---|---|---|
| 60-110419 | 6/1985 | (JP) . |
| 61-66623 * | 4/1986 | (JP) . |
| 923857 | 4/1982 | (RU) . |

* cited by examiner

Primary Examiner—Mathieu D. Vargot
(74) Attorney, Agent, or Firm—Arter & Hadden LLP

(57) ABSTRACT

Stress-relieved molded acrylic opthalmic lenses, and injection-coining mold processes for molding stress-relieved plus and minus to high-minus diopter ophthalmic lenses of optically superior acrylic resin, able to pass standardized impact drop tests for use in eyeglass lenses, are described. The injection-coining processes use two-plate and three-plate mold assemblies. The cavity of a two plate runnerless mold is partially filled under partial tonnage, and the movable half of the mold controlled to coin and densify the acrylic resin under secondary or full tonnage, when a velocity-pressure changeover point is reached. In a process which employs a three-plate mold assembly, the lens mold cavities are partially filled under less than total clamp tonnage, with a cavity plate held by hydraulic pressure against movable half of the mold. The mold assembly is then closed under full tonnage when a velocity-pressure changeover point is reached, collapsing the cavity plate against a stationary platen, bringing the mold assembly to a total stack height. The processes produce impact resistant acrylic ophthalmic lenses which are stress-relieved and without weld lines, even in the high minus diopter range, with center thickness' as low as one millimeter, the edge thickness' up to ten millimeters.

19 Claims, 9 Drawing Sheets

(3 of 9 Drawing Sheet(s) Filed in Color)

| Lens Sample | Material | Thickness @ center (mm) | Max. force for 50% failure (in-lbs). |
|---|---|---|---|
| 1. Magnivision - 5.25 | Acrylic | 1.3 | 37 |
| 2. Magnivision - 1.00 | Acrylic | 1.3 | 22.5 |
| 3. Magnivision - 2.25 | Acrylic | 1.3 | 22.5 |
| 4. Magnivision +2.5/-1.00 | Acrylic | 1.3 | 25 |
| 5. Magnivision +3.75/-1.25 | Acrylic | 3.8 | 40 |
| 6. Magnivision +4.00/-1.25 | Acrylic | 6.4 | 40 |
| 7. Magnivision -6.00 | Acrylic | 1.3 | 30 |
| 8. Acrilite Baked 75 mm - 3.25/-1.00 | Acrylic | 1.7 | 25 |
| 9. Acrilite Baked 75 mm - +2.50/-1.5 | Acrylic | 1.7 | 25 |
| 10. Gentex 70 mm -2.00 | Polycarbonate | 1.9 | >80 |
| 11. Versalite 71 mm -6.25 | Polycarbonate | 8.9 | >80 |
| 12. Gentex 70 mm -4.00 | Polycarbonate | 1.7 | >80 |
| 13. Lite Weights 82 mm | Polycarbonate | 1.0 | >80 |
| 14. Gentex Baked 70 mm -2.00 | Polycarbonate | 1.9 | >80 |
| 15. Nalco 71 mm-6.25 | CR 39 | 1.9 | 15 |

FIG. 7

STRESS-RELIEVED ACRYLIC OPTICAL LENSES AND METHODS FOR MANUFACTURE BY INJECTION COINING MOLDING

FIELD OF THE INVENTION

The present invention pertains generally to the manufacture of objects by injection molding, such as lenses and, more particularly, to the molding of ophthalmic vision correction lenses with injection-coining molding processes.

BACKGROUND OF THE INVENTION

Vision correction and magnification lenses for eyeglasses were originally made of glass. More recently, lenses have been made from polycarbonate material molded in different types of injection molding processes. Polycarbonate lenses are much lighter than glass lenses of the same power, and are sufficiently strong to pass a standardized drop/breakage test, ANSI Z80.1-1995, in which a 0.56 ounce steel ball is dropped from a vertical height of 50 inches on to the center of the lens, even with a relatively thin center thickness in a range of approximately 1.0 to 1.5 mm. However, polycarbonate lenses have the disadvantages of producing birefringence at the perimeter of the lens, and a tendency to yellow with age.

Acrylic material, also referred to as polymethylmethacrylate or PMMA, is a preferred material for optical lenses due to its superior optical properties, light transmittance, reduced weight, and lack of tendency to yellow with age. However, molded acrylic is more brittle than molded polycarbonate, due to its relatively low glass transition temperature, higher density and higher tensile strength. Although magnifying, non-refractive, and positive diopter ophthalmic lenses have been molded out of acrylic, such lenses generally have molded-in stresses, produced by shearing of the material in the molding process, which make them brittle and not able to pass the standard drop ball impact test. Shearing of the acrylic material is also caused by the wide range of thickness across the lens, particularly in the high-minus ophthalmic lenses, which may range from a center thickness of one millimeter to an edge thickness as much as ten millimeters. Discontinuity in the rate of flow of material into the mold cavity also causes shearing which produces birefringence in the molded lens.

In a prescription lens mold cavity, the molten acrylic tends to flow in a generally annular path about the thickest cross-sectional areas of the mold first, and then fills in the thinnest area, for example, at the relatively thin center region of a minus power lens. If not injected into the mold under the correct temperature, pressure and velocity, a weld line will form where the annular flows of material converge, at a point generally opposite the mold gate. Because of the extreme difference in cross-sectional thickness of the mold cavity, the molding material will cool at different rates, resulting in "sinks" or the solidification of the thinner portions before solidification of the thicker portions, also producing molded-in stresses which make the lens brittle and unable to pass the standard impact drop test. Also, molding lenses under relatively high pressures, up to 20,000 psi plastic pressure, produces greater stresses and birefringence in the lens as compared to lenses formed under lower pressure.

Many different approaches have been taken to the injection molding of lenses. In addition to straight injection (which generally produces unsatisfactory results), injection-compression processes, using variable clamp pressures on the movable half of the mold, and insert mold assemblies have been used. Also, in traditional injection-compression processes the halves of the mold are separated to a visible extent, e.g. up to 2 or 3 mm during the filling phase, making the rate of cavity fill critical to avoid blow-out of material between the mold halves. This type of consistent close process control is made more difficult when using acrylic because of its relatively low glass transition temperature, and for this reason it has been avoided as a material for lenses with high thickness variation.

With insert mold assemblies, there is typically some type of movable insert within one or both of the mold halves, which are movable relative to the mold cavity, to change the volume of the cavity during the molding process. In some systems, movement of the inserts is controllable independent of the clamp force. Insert control mechanisms of the prior art are typically complex and duplicated for each cavity of the mold, making them expensive and difficult to maintain. Also, the movement of the inserts must be controlled precisely in accordance with the introduction of material into the mold cavity in order to achieve the desired optically clear results.

SUMMARY OF THE INVENTION

The present invention provides an improved method and process for injection-coining molding of positive and minus diopter lenses out of acrylic material, which are stress-relieved and able to pass a standardized impact resistance test. As used herein, the term "injection-coining" refers to injection mold processes wherein separation of the mold plates under reduced or less than full tonnage is minimal, e.g. generally less than 0.5 mm. In accordance with a general aspect of the invention, there are provided two different methods of molding acrylic lenses by injection-coining operations, one which uses a two-plate hot runner type mold, and another which uses a three-plate cold runner mold.

The injection-coining molding method performed with a two-plate mold includes the steps of preparing an injection molding machine with mold halves defining a mold cavity in the form of an ophthalmic lens having varying cross-sectional thickness, wherein one of the mold halves is movable relative to the other; providing a source of acrylic resin for injection by an injection screw into the mold cavity through a mold gate; positioning a movable mold half to an open position; closing the mold under a primary clamp pressure followed by an intermediate pause between the mold halves; controlling the injection screw to advance material into the mold until the mold is approximately 90% filled and the machine's velocity changeover position is made, closing the mold halves together completely thereby coining the material in the mold cavity, increasing the pressure on the mold to full tonnage for a specified period of time; holding the injection screw forward under the specified time and pressure until the mold gate freezes; advancing the injection screw under packing pressure and time; after the packing pressure hold time, retracting the injection screw back to a metering position during which time the material in the mold solidifies; opening the core half of the mold to a stop setpoint with the cavity plate in a collapsed position.

By this two-plate mold injection coining process, a wide range of optically clear ophthalmic lenses, and in particular a wide range of minus diopter power lenses, from approximately −0.25 to approximately −1.50, can be molded of the preferred acrylic material, without molded-in stresses or birefringence, and which are able to pass a standardized impact test, making them suitable for use as eyeglass lenses.

In accordance with another aspect of the invention, a three-plate mold is used in an injection-coining molding operation to form stress-relieved ophthalmic lenses out of acrylic resin by the steps of: preparing an injection molding machine fitted with a three-plate mold having a stationary half, a cavity plate which is movable relative to the stationary half by a distance at least equal to a coining stroke of the injection-coining molding operation, and a movable half or core plate movable relative to the cavity plate and stationary half, the machine being programmed for control of injection-coining parameters including plastic temperature, plastic flow rate, plastic pressure, plastic cooling rate, clamp closing velocity, velocity-pressure (VP) changeover position, and coining stroke of the cavity plate relative to the stationary half of the mold; subsequent steps including activating the injection molding machine and an associated control system by which the mold is controlled to open the movable half of the mold to an open set position, closing the mold under a primary clamp pressure to an intermediate position or pause between the mold halves, advancing the mold material injection screw until the mold is approximately 90% filled and a VP changeover position is made, closing the two mold halves together completely thereby causing the cavity plate to collapse against the stationary half of the mold by a distance equal to a coining stroke, holding the closed mold halves together under high pressure and holding the injection screw forward for a time and pressure parameter, packing the mold by forward advancement of the injection screw, retracting the injection screw back to a metering position, allowing molded parts to solidify, opening the movable core half of the mold to a stop point, holding the cavity plate in a collapsed position against the stationary half of the mold, and ejecting molded parts from the mold.

These and other aspects of the invention are herein described in detail with reference to the accompanying Figures.

BRIEF DESCRIPTION OF THE FIGURES

The file of this patent contains at least one drawing in color. Copies of this patent with colored drawings will be provided by the Patent and Trademark Office upon request and payment of the necessary fee.

FIG. 7 is a chart of impact test results with various lenses of the present invention and other lenses.

DETAILED DESCRIPTION OF PREFERRED AND ALTERNATE EMBODIMENTS

The methods of the present invention can be used in connection with different types of injection molds, including conventional two-plate or runnerless molds, and three-plate injection-coining molds. As used herein, the term "injection-coining" refers to the control of a moveable half or intermediate cavity plate of a mold assembly, relative to a stationary plate of the mold assembly, by which the moveable half or component or plate of the mold assembly is controlled to move the core plate to apply a coining stroke relative to the stationary half of the mold, to densify material within the mold cavity.

Figure 1:
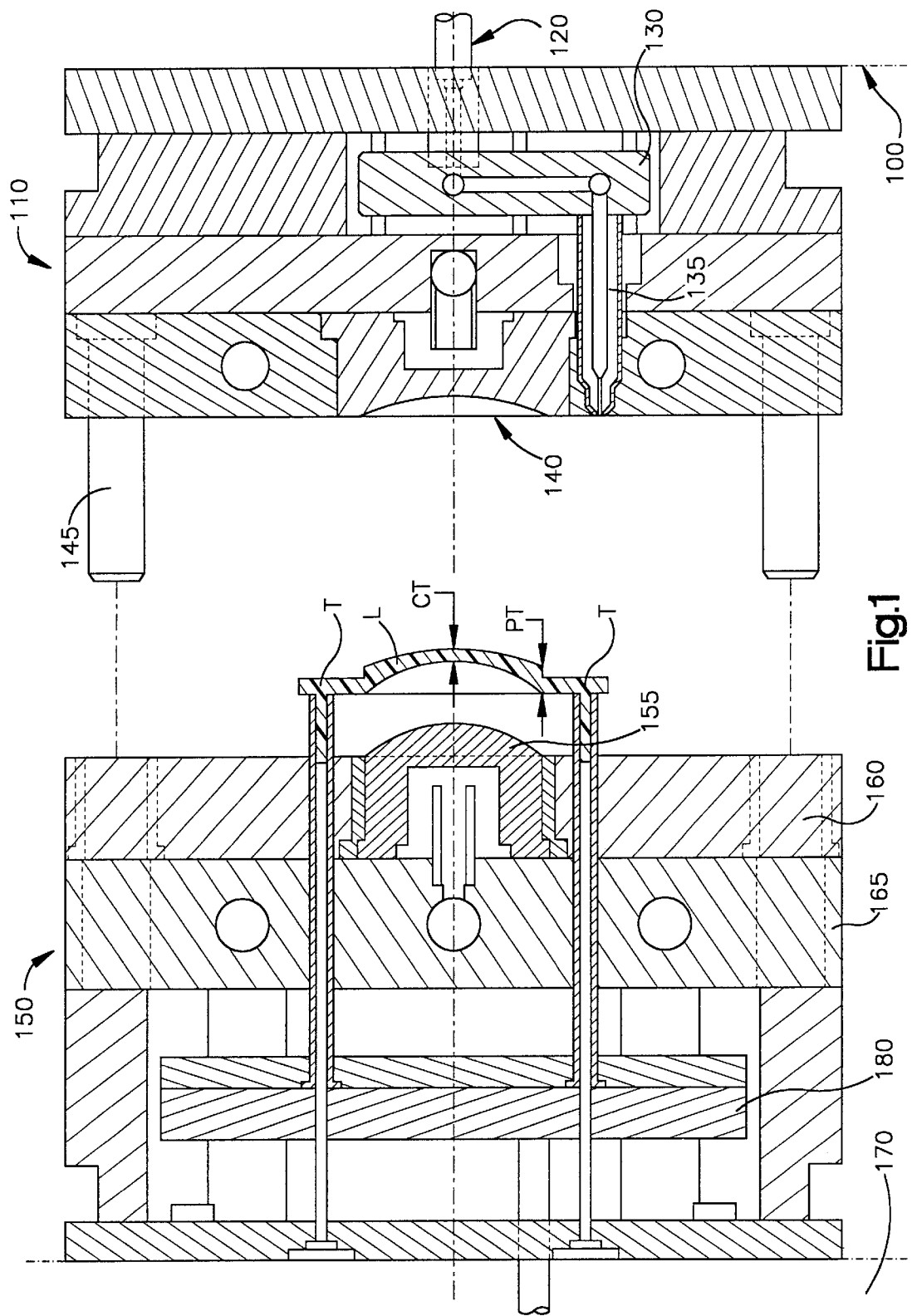
FIG. 1 is a schematic elevation of a two plate mold assembly.

An injection-coining lens molding process of the invention is able to be carried out with a conventional two plate or "runnerless" mold, as depicted in FIG. 1, with a stationary A half 110 attached to a stationary platen 100 of an injection molding machine. A mold material injection screw (connected to a plasticating unit including an injection unit having a heated extruder barrel, hopper feed chamber, injection ram and associated drive unit, all as known in the art and not shown) is connected via a sprue 120 to the stationary A half 110. The stationary A half further includes a hot runner manifold assembly 130, hot runner nozzle 135, and mold cavity 140. Guide pins 145 are inserted into the movable B half of the mold, indicated generally at 150. On the B half 150 is the mold cavity core 155 mounted on a movable core plate 160, attached to a support plate 165, attached to a moving platen 170. In this particular embodiment, the mold cavity 14 is configured to form a negative diopter lens L, with a center thickness CT which is less than a peripheral thickness PT. Overflow tabs T extend from mold cavity 140. Although described in connection with this type of lens, the invention is not limited to negative diopter lenses. In fact, the processes of the invention are applicable to injection molding of any type of article, and is particularly useful in molding articles with varying wall thickness', and where avoidance of molded-in stresses is required. An ejector assembly 180 is integral with B half 150. The movable core plate 160 is controllable to be coined against the stationary A half 110 at varying tonnages during the injection and solidifying steps of the process as further described herein.

Figure 2:
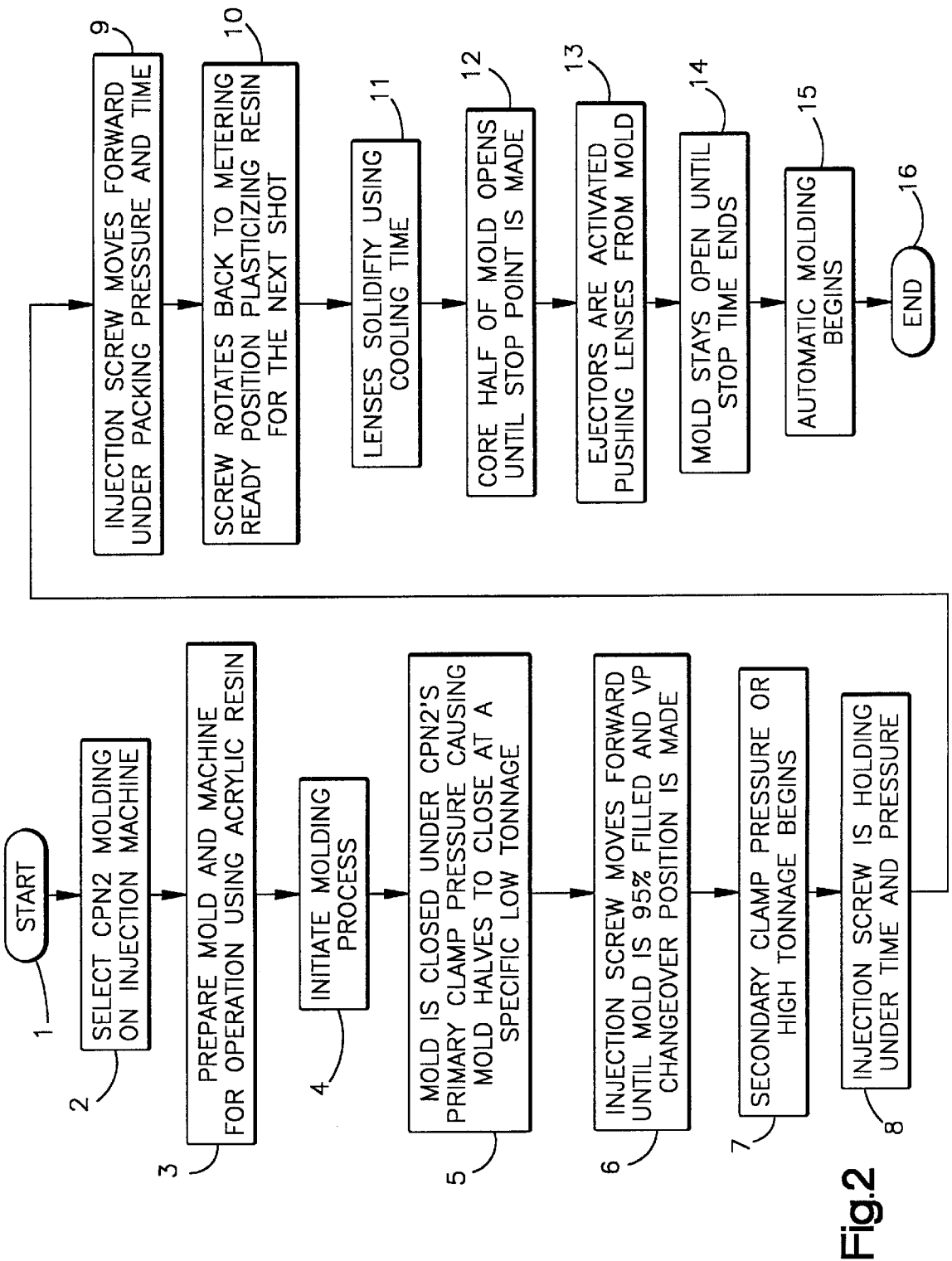
FIG. 2 is a flow chart of a series of control steps of a molding process of the present invention utilizing a two plate mold in an injection molding machine.

The injection-coining process of the invention can be performed with this type of two plate hot runner mold apparatus in the sequence as generally set forth in FIG. 2. The invention provides optimal ranges of critical mold process control parameters, including plastic temperature, plastic flow rate, plastic pressure, plastic cooling rate, clamp closing velocity, velocity-pressure (VP) changeover position, and coining stroke. For each of the described steps of the two-plate injection-coining acrylic lens molding process, there have been identified certain parameters by which stress-relieved ophthalmic lenses can be molded while avoiding excessive shearing of the acrylic resin material, and the resultant sinks and stresses. The following numeric and percentage values are representative of one particular set-up of a particular type of injection molding machine, such as a Nissei FN series machine. The invention can be performed with other suitable types of injection molding machines. The invention is not limited to these particular values or ranges.

The machine is started, and the control system activated at step 1, with the settings of Hi mold V 15%, primary open V 10%, open stop position 316 mm, and slow distance 60.0 mm. At step 2, the mold machine is prepared by setting the following parameters at the approximate specified values and ranges.

| | |
|---|---|
| Hi-mold close velocity | 20% |
| Clamp slow velocity | 26% |
| Low mold close pressure | 18% |
| Hi-mold close pressure | 99% |
| Slow change position | 50.0 mm |
| High pressure change position | 0.8 mm |
| Open/slow velocity | 10% |
| CPN2 switch on | |
| Primary clamp pressure | 70–80% |
| Primary clamp pressure time | 0.70 sec. |
| Secondary clamp pressure time | 0.50 sec. |
| P4 | 20–70% |
| VP5 | 52% |
| VP4 | 60% |
| VP3 | 85% |
| VP2 | 90% |
| VP1 | 90% |
| Hi-mold open velocity | 15% |
| Primary open velocity | 10% |
| Open stop position | 316 mm. |
| SLW Distance | 60.0 mm |

At step 3, the mold and machine are prepared for operation with acrylic resin by setting the following parameters in the following specified ranges:

| | Barrel Temperatures |
|---|---|
| Nozzle | 455–465° F. |
| Front | 465–475° F. |
| Mid | 465–475° F. |
| Rear | 455–465° F. |
| Water temperatures A and B | 225–235° F. |
| Injection Time | 40–60 sec. |
| Cooling Time | 60–85 sec. |
| MTG ST Time | 25–60 sec. |
| V5 | 40–25% |
| V4 | 40–25% |
| V3 | 90–40% |
| V2 | 40–30% |
| V1 | 40–30% |
| (Shot decompression) SD-3 | 2 mm. |
| (Shot measuring) SM-60 | 51 mm. |
| S1 | 45–20 mm. |
| S2 | 37–16 mm. |
| S3 | 14–10 mm. |
| S4 | 12–5 mm. |
| S5 | 11.8 –3 mm. |
| TP2 | 1.5 sec. |
| TP3 | 1.5 sec. |
| P4 | 70–20% |
| P3 | 70–20% |
| P2 | 65–20% |
| P1 | 60–20% |
| VS | 15% |
| Back pressure | 10–12% |
| Eject pressure | 45–20% |
| FWD EV1 | 35–25% |
| FWD EV2 | 3–1% |
| Start time | 2.0–0.5 sec. |
| EV2 CHG | 15.0–11.0 mm. |
| FWD STP | 18.2–15.0 mm. |
| BWD EV4 | 30–25% |
| BWD PRESS | 30–25% |
| Cycle start | 0.50 sec. |

The molding process is initiated at Step 4 with the selector switch in the semi-automatic position. At step 5, the mold is closed to a primary clamp pressure according to the CPN2 control system parameters at a specified low or less than maximum tonnage. At step 6, the injection screw is advanced under the specified parameters until the mold is approximately 95% filled and the specified velocity-pressure (VP) changeover position of the injection screw is reached. At step 7, the control system induces secondary clamp pressure of the mold halves to high or maximum tonnage. At step 8, the injection screw is held forward under specified time and pressure, e.g. TP2—1.5 sec. and P2 65–20%. At step 9, the injection screw is advanced under the specified packing pressure and time. At step 10, the injection screw rotates back to a metering ready position to accept plasticizing resin for the next shot. The parameters of cooling time 60–85 sec., V5 15%, back P 10–12%, SM 60–51 mm and 5D 3–2 min. are reached. At step 11, the molded pieces solidify for the specified cooling time (60–85 sec.). The core half of the mold is opened to a stop point at step 12, Hi-mold open V 15%, primary open V 10%, open stop position 316 mm slow distance 60 mm. The ejectors are actuated at step 13 to eject the molded parts from the core half of the mold under eject P 45–20%, FWD EV1 35–75%, FWD EV2 3–1% Start t 2.0–5 sec. EV2 chg. 15–11 min., FWD stop 18.2 mm–15 mm, BWD EV4 30–25%. The mold halves are held open for a specified stop time at step 14. The automatic molding cycle is set to recommence at step 15 with the selector switch on auto, hi-mold close V 20%, clamp slow V 26%, low mold close P 18%, hi-mold close P 99%, slow chg. pos. 50 mm, Hi P chg. pos. 18 mm. At step 16, the process is repeated, beginning with the primary clamp P 80–70%.

Figure 3:
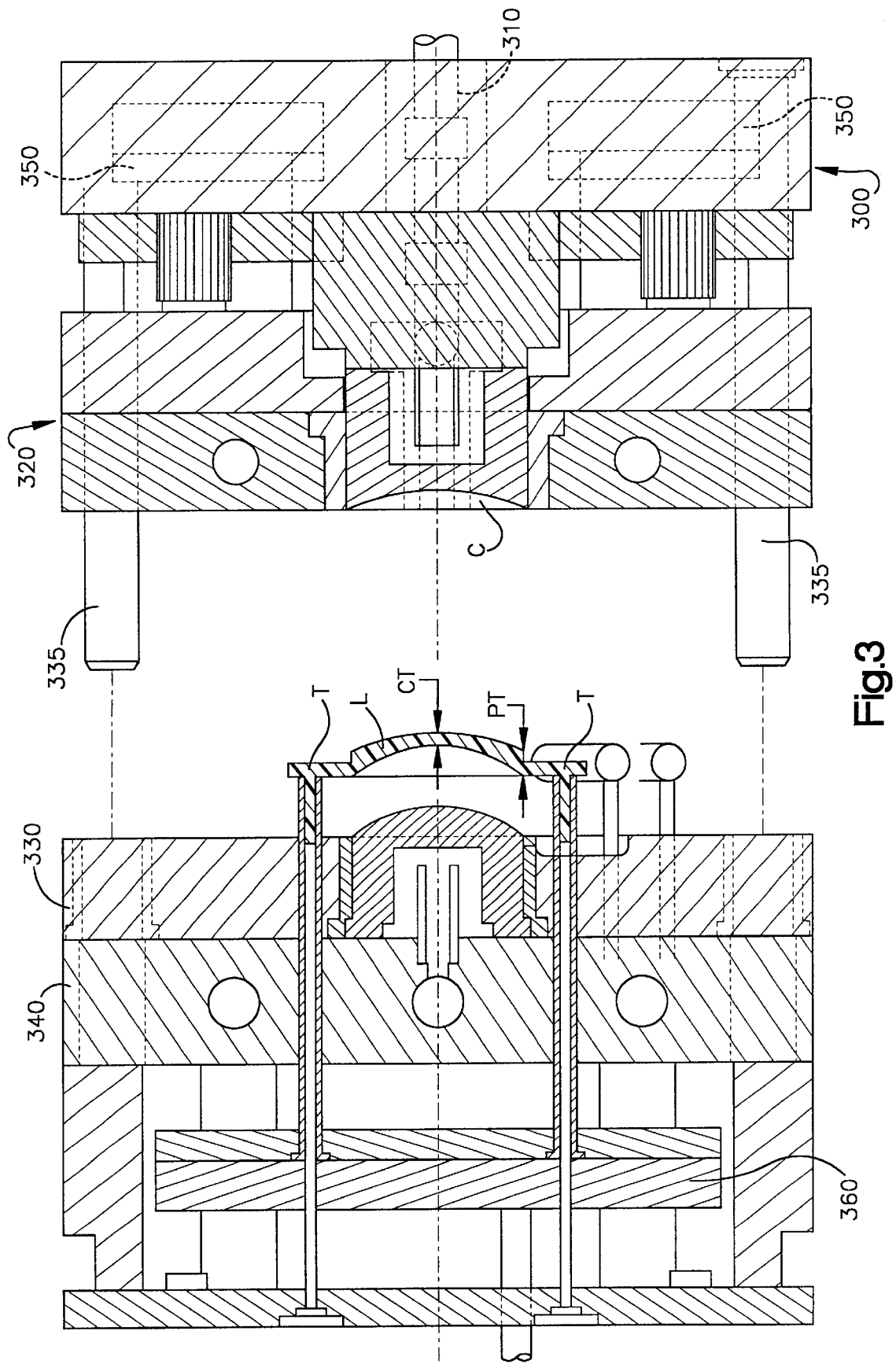
FIG. 3 is a schematic elevation of a three plate mold assembly.

Another injection-coining mold process of the invention is performed with a three plate mold assembly, as shown in FIG. 3, which has a stationary platen assembly 300, into which a nozzle 310 of a mold material injection screw leads. A cavity plate assembly 320 is positioned between the stationary platen assembly 300 (A half) and a movable core plate 330 ( also referred to as the "B half") or "moveable half" of the mold assembly. The cavity plate 320 and movable core half 330 are aligned with guide pins 335. The movable core plate 330 is attached to a support plate 340. One or more mold cavities C are formed between the cavity plate 320 and the core plate 330, to define the molded lens L. Although tabs T may be formed to extend from cavity C, it is preferred that excess material flow backward through a material injection sprue extending from nozzle 310. As shown, the lens L is a negative diopter lens, having a center thickness CT which is less than a peripheral thickness PT. However, the invention is not limited to this particular type of lens. A hydraulic cylinder assembly 350 is incorporated into the stationary platen assembly 300. An ejection assembly 360 is incorporated into the movable core plate 330. In a three plate injection-coining mold assembly, the movable core plate 330 is clamped against the stationary cavity plate 320 and platen assembly 300, for example at a partial tonnage, and the cavity plate 320 is separately controllable (for example by hydraulic actuators) to compress against the core plate 330 to exert a coining operation on material in the mold cavity C. Thereafter, the movable core plate 330 is coined against the stationary platen assembly 300 and cavity plate 320 at full tonnage.

Figure 4A:
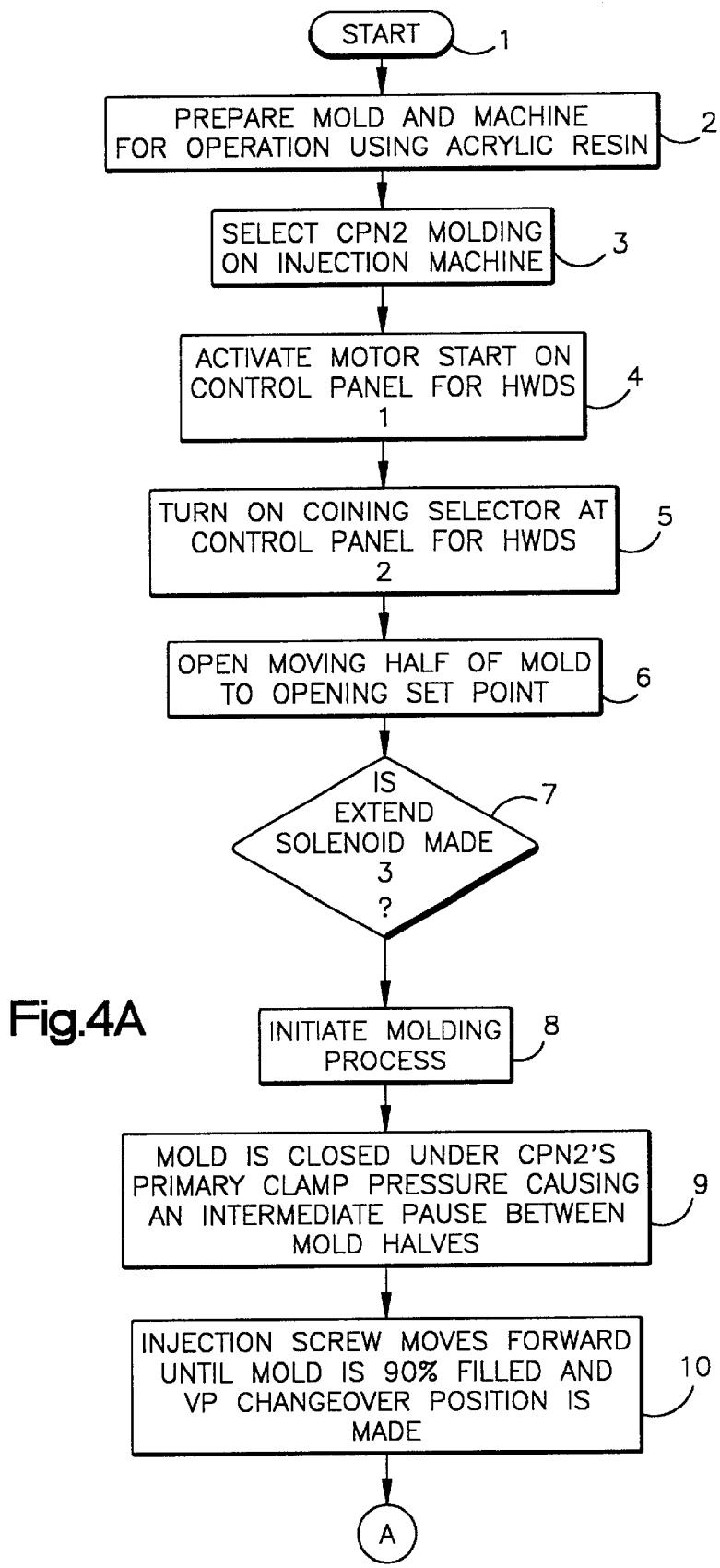
FIG. 4 is a flow chart of a series of control steps of a molding process of the present invention utilizing a three plate mold assembly in an injection molding machine.
Figure 4B:
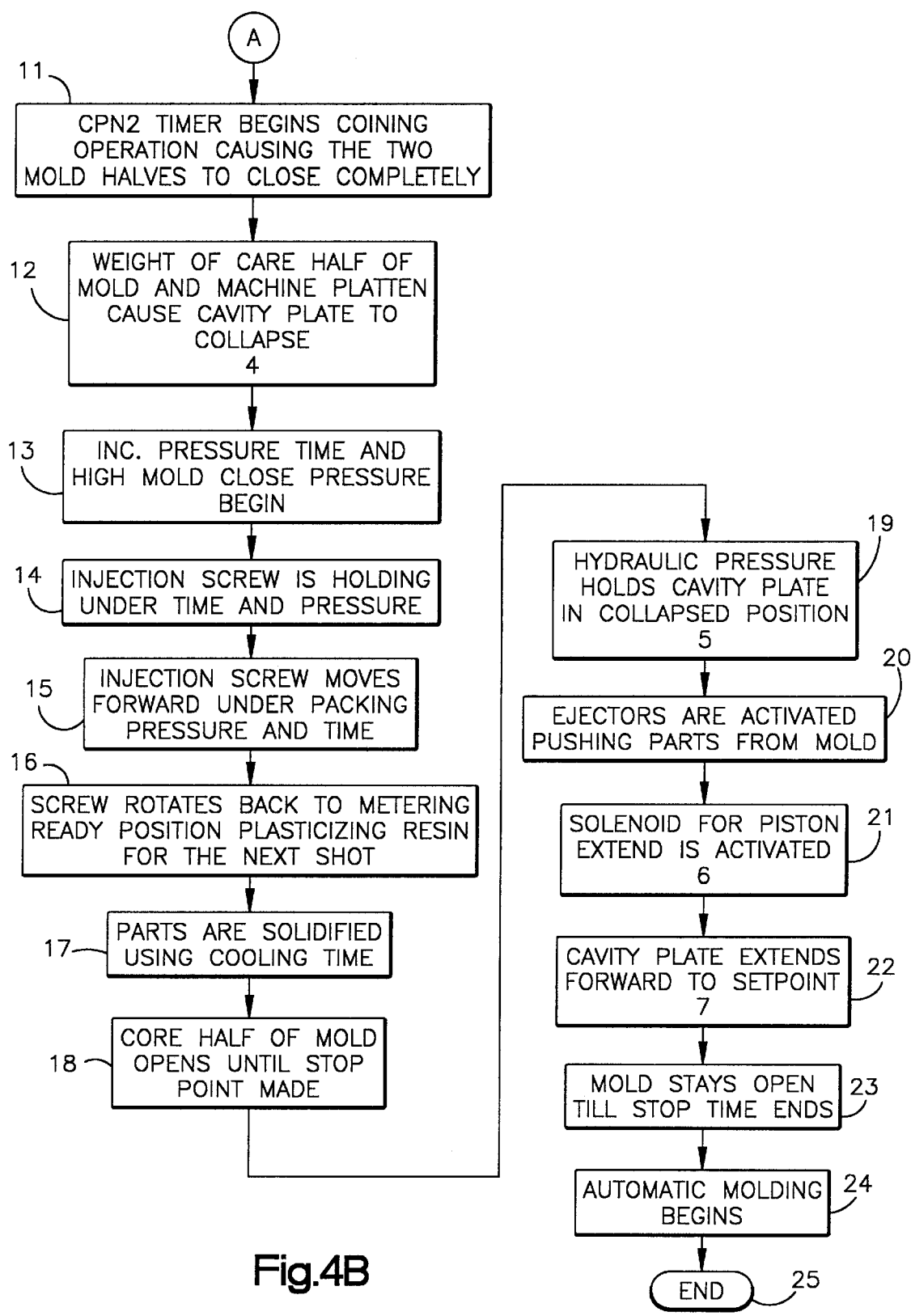
Figure 5A:
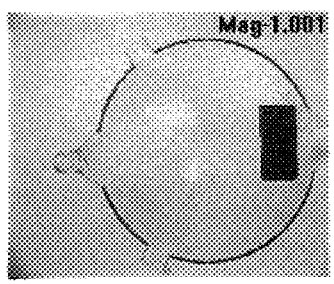
FIGS. 5A–5K are spectral photographic images stress-relieved positive and minus diopter ophthalmic lens formed of acrylic resin by an injection-coining molding operation of the present invention.
Figure 5E:
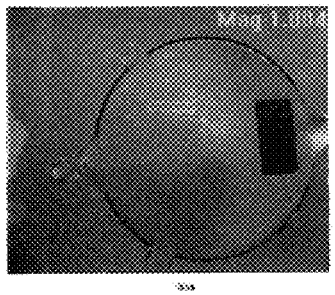
Figure 5I:
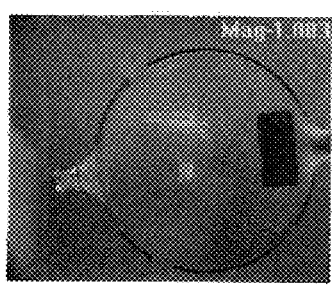
Figure 5B:
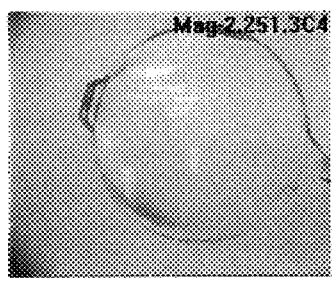
Figure 5F:
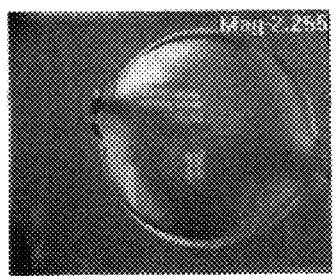
Figure 5J:
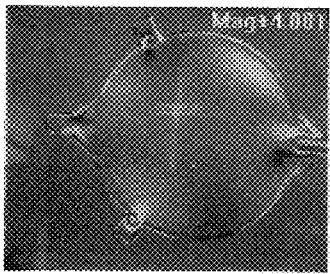
Figure 5C:
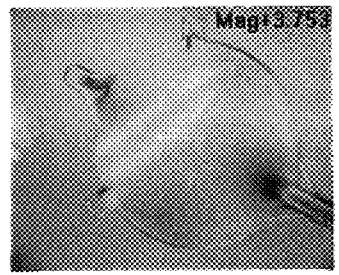
Figure 5G:
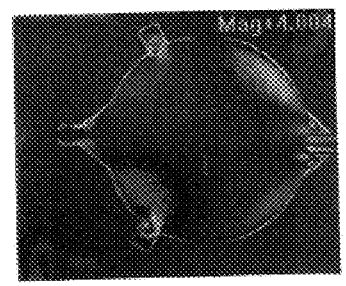
Figure 5K:
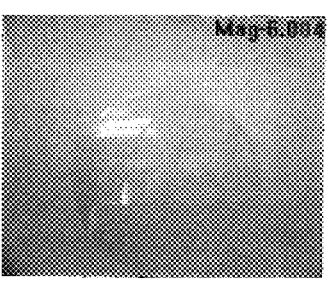
Figure 5D:
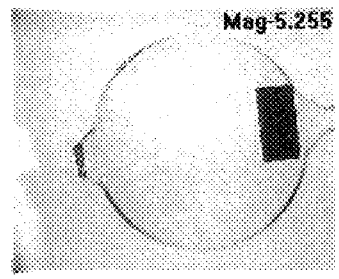
Figure 5H:
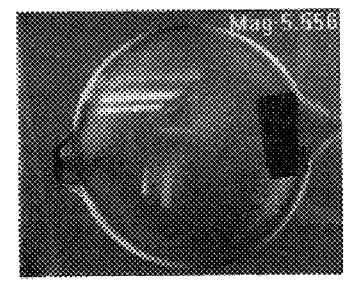

A sequence of control steps of the invention for controlling a three-plate mold in an injection coining operation for molding stress-relieved ophthalmic lenses out of acrylic resin material is set forth in FIG. 4. The described process is performed, for example, with a Nissei injection molding machine having a control system programmed with CPN2 software to monitor and control all aspects of the molding operation such as: temperature of the plasticating unit and the mold; position of the injection screw and mold components; velocity of the screw; velocity of mold closure and coining operation of the cavity plate; pressure during the holding and packing phases, etc.

The machine is started at step 1 and prepared at step 2 for molding with acrylic resin, including installation of the mold assembly in the machine, setting of mold and barrel temperatures, open/close parameters, flow rate, and pressure gradients, plastic cooling rate, clamp closing velocity, velocity-pressure changeover position, and the coining stroke. As part of the injection-coining operation sequence, the following settings, parameters and ranges at the designated steps are part of the process of the invention.

| Step 2 | |
|---|---|
| Barrel Temperatures | |
| Nozzle | 460–470° F. |
| Front | 470–480° F. |
| Mid | 470–480° F. |
| Rear | 445–455° F. |
| Jnjection time | 45–60 sec. |
| Cooling time | 110–150 sec. |
| Metering Delay | 45 sec. |
| Mold Water Temp. | 230–240° F. |
| Ejection Backward Stop | 7.0 mm. |
| Stop time | 8.5 sec. |
| EV2 chg. | 30 mm. |
| V5 | 16–18% |
| V4 | 18–20% |
| V3 | 19–22% |
| V2 | 19–23% |
| V1 | 19–24% |
| Decomp. V | 10% |
| PV1 | 30–95% |
| Tp2 | 1.5–4 sec. |
| Tp1 | 1.5–4 sec. |
| Cycle start | 0.50 sec. |
| Eject P | 90–88% |
| Forward stop | 45–34 min. |
| Repeat Eject EV | 3–50% |
| BWD P | 30% |
| BWD EV4 | 30% |
| Shot decompression | 1.0 min. |
| Shot meaning | 99–137 min. |
| SV1 | 65 min. |
| SV2 | 55 min. |
| SV3 | 45 min. |
| SV4 | 35 min. |
| NP change mode position | 4–10 min. |
| Pp3 | 25–20% |
| Pp2 | 20% |
| Pp1 | 20% |
| FWD EV1 | 59–50% |
| FWD EV2 | 2% |

The molding machine control software, programmed with the above parameters, is activated at step 3 according to the following settings.

| CPN2 Switch On | |
|---|---|
| Inc. PTM | 0.12 sec. |
| CPN start | 0.22 sec. |
| Inc. ptm | 0.99 sec. |
| Clamp P | 75–80% |
| Hi mold close P | 99% |

The injection screw motor is started at step 4. At step 5, the coining control selector is turned on at a machine control panel. At step 6, the moving half of the mold is opened to the programmed setpoint as follows:

| Step 6 | |
|---|---|
| Opening Set Point | 317 mm |
| End V | 5% |
| Hi V | 15% |
| Open StV | 2% |
| Slow distance | 60 min. |
| Hi V1 | 8 min. |

At step 7, the piston extend solenoid, which extends the cavity plate to a position spaced from the stationary platen assembly, is confirmed to be in an extended position, which defines a coining stroke which may be, for example, in the approximate range of 1.50–2.00 mm. At this point the machine is ready to commence the molding process, which is initiated at step 8, with the selector switch in a semi-automatic mode.

At step 9, the mold is closed under the programmed primary clamp pressure, causing an intermediate pause between the platen assembly and the movable core half, as follows:

| Step 9 In addition to the parameters of step 3: | |
|---|---|
| Slow str. | 13 min. |
| Slow end | 11 min. |
| Mid slow | 8% |
| CVLP | 10 min. |
| Hi V | 8% |
| Mid slow | 4% |
| Low V | 2% |

A step 10, according to the programmed control parameters of step 2 and step 3, the injection screw is advanced until the mold cavity is filled to approximately 90–96% of its volume, and the preprogrammed velocity-pressure changeover position of the injection screw is reached. At step 11, the control system timer begins the coining operation in which the A and B mold halves (the platen assembly and core half) are closed completely together, at increased pressure time of 0.12 sec. and clamp pressure of 75–80%. At step 12, the weight of the fully closed core half and machine platen cause the cavity plate to collapse between the mold halves, bringing the mold assembly to a total stack height at which the final volume of the mold cavity C is defined, and performing a coining operation on the material in the mold cavity at CPN start 0.22 sec., and high pressure 99%. At step 13, the process is advanced to the increase pressure timer and high mold pressure parameters as follows:

| | |
|---|---|
| Inc. ptm. | 0.12 sec. |
| CPN start | 0.22 sec. |
| Inc. ptm. | 0.99 sec. |
| Clamp pressure | 75–80% |
| High mold close pressure | 99% |

At step 14, the injection screw is held at the programmed packing pressure and time until the mold gates freeze. For example:

| | |
|---|---|
| TP2 | 1.5–4 sec. |
| TP1 | 1.5–4 sec. |
| Pp1 | 20% |
| Pp2 | 20% |
| Pp3 | 25–20% |

At step 15, the injection screw moves forward under packing pressure and time. When the packing time is completed, at step 16 the injection screw rotates back to the metering ready position to accept plasticizing resin for the next shot.

| | |
|---|---|
| Cooling time | 110–150 sec. |
| V5 | 12% |
| Sm | 99–137 min. |
| BP | 3.0% |
| SD | 1.0 min. |

At step 17, the parts are solidified during a cooling time of 110–150 sec., while the injection screw rotates back to the metering ready position. At step 18, the core half of the mold opens automatically to the stop point open end V 5%, HiV. 15%, Open stv. 2%, slow distance 60 mm., $HiV_1$ 8 mm. while, at step 19, hydraulic pressure holds the cavity plate in the collapsed position against the core half, by a coining stroke of 1.75–2.00 mm. Once the open setpoint is made, the ejector system pushes the parts from the mold at step 20 by the following settings:

| | |
|---|---|
| Eject bwd stop | 7 mm. |
| Stop time | 8.5 sec. |
| EV2 | 30 mm. |
| FWD stop | 45–34 mm. |
| Repeat eject EV3 | 50% |
| BWD press. | 30% |
| BWD EV4 | 30% |

At step 21, the solenoid for piston extend is activated and the cavity plate extends forward at step 22 (1.75–2.00 mm), away from the core half to the opened setpoint. The control timer runs out at step 23 (8.5 sec.) to signal re-initiation of the automated molding cycle at step 24, or shut down at step 25.

Various minus diopter lenses molded by the described injection-coining processes were tested according to the ANSI Z80.1-1995 drop/breakage test. Lenses with center thicknesses ranging from 1.00 mm to 1.5 mm, and edge thicknesses ranging from approximately 3 mm to approximately 10.5 mm passed this test. Lenses molded in accordance with the invention were polarigraphically analyzed, using a Mitsubishi strain tester with linearly polarized light and a tint filter for color enhancement. FIGS. 5A–5K are images of acrylic lenses of the invention with the polarizer adjusted to show three background colors—green, blue and purple. The index of refraction in a strained material becomes directional and the change in the index is proportional to stresses. As a result of these refractive changes, polarized rays vibrating in planes of principle stress emerge with a relative phase shift and produce color interference fringes or multicolored bands. A uniform color in an image indicates a uniform stress level. A transition from one color to its conjugate color (i.e. blue to red) is referred to as a fringe, indicating a transition from a peak stress value of one sign to a peak stress value of the opposite sign. Fringe patterns generally indicate a significant increase in stress level.

Figure 6A:
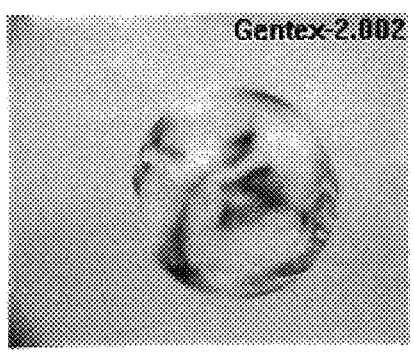
FIGS. 6A–6P are spectral photographic images of molded polycarbonate lenses of the prior art.
Figure 6E:
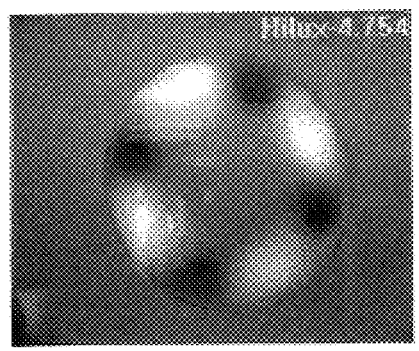
Figure 6B:
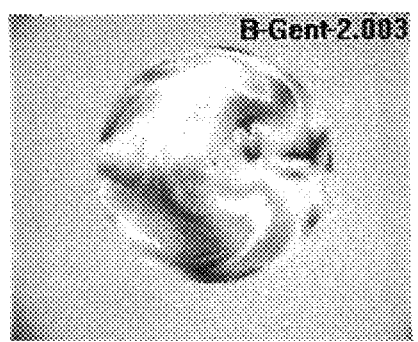
Figure 6F:
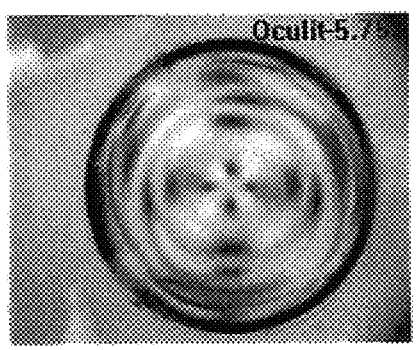
Figure 6C:
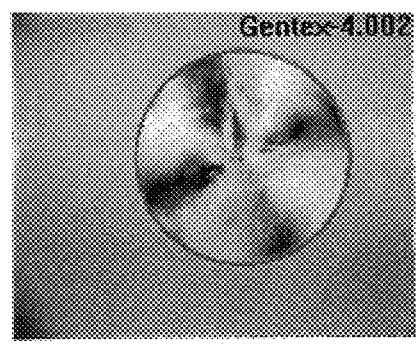
Figure 6G:
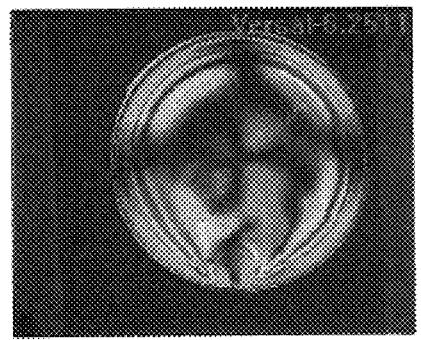
Figure 6D:
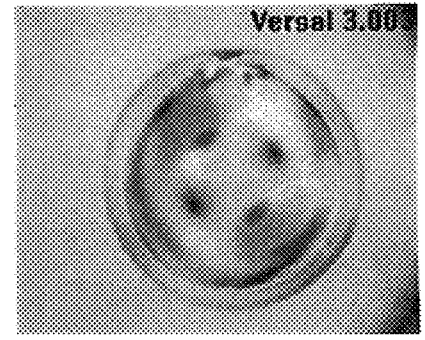
Figure 6H:
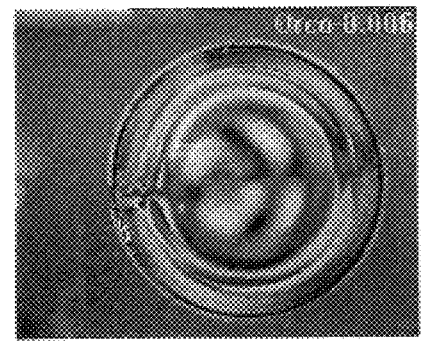
Figure 6I:
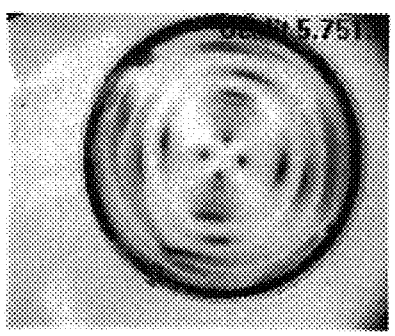
Figure 6M:
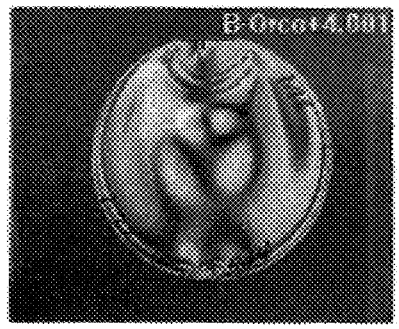
Figure 6J:
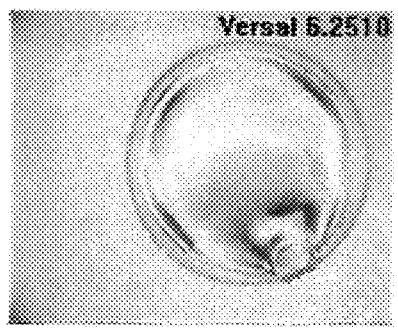
Figure 6N:
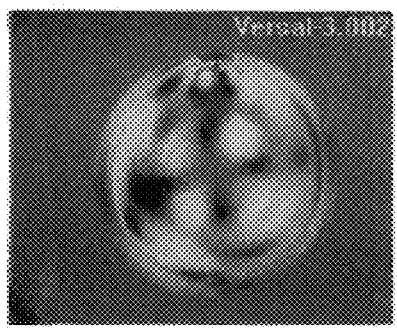
Figure 6K:
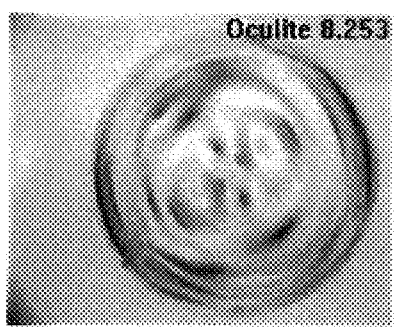
Figure 6O:
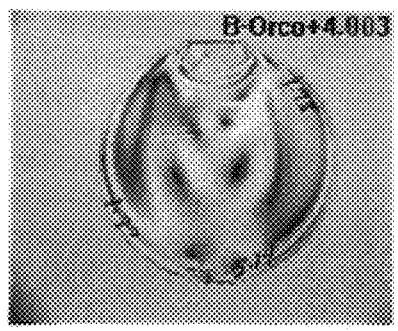
Figure 6L:
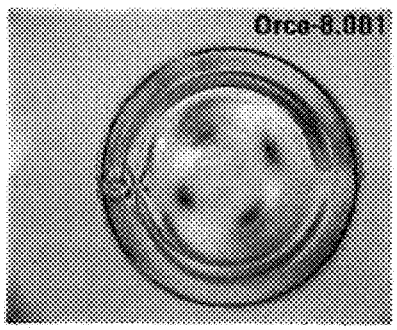
Figure 6P:
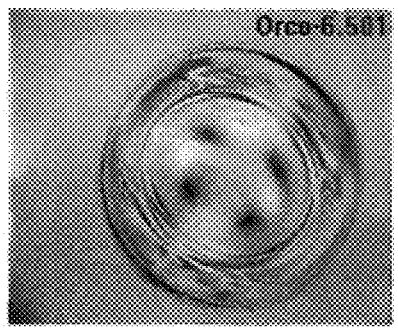

FIGS. 5A–5K are polarigraphic images of lenses molded of acrylic resin by the described injection-coining processes. The diopters of the lenses are noted on each Figure. The lenses are substantially stress-free as proven by the absence of fringes. The lenses of FIGS. 5A, 5C, 5E, 5G, 5I and 5J were molded with a two plate mold assembly. The lenses of FIGS. 5B, 5D, 5F, 5H and 5K were molded with a three-plate mold assembly. FIGS. 6A–6P are polarigraphic images of various types of lenses, of the noted diopters, made of injection molded polycarbonate. Similarly, photographs as FIGS. 5A–5K to show fringe patterns which indicate stresses. The prominent fringes in these images indicate molded-in stresses in the lenses, requiring the lens to have a greater thickness, or to rely on the flexibility or inherent strength of the material in order to pass the vision lens impact test.

These images prove the structural superiority of the acrylic lenses molded in accordance with the methods of the invention, and the accompanying strength sufficient to pass various impact tests. In another type of impact test known as the Gardner Falling Dart, acrylic lenses of the invention were positioned on a flat steel plate, convex side up. A dart with a two pound, 0.5 inch diameter flat bottom is dropped vertically on to the lens in 5 in./lb. increments. FIG. 7 sets forth results of this test on different lenses, including lenses 1–7 of the present invention. Lenses 8 and 9 were also made of acrylic, lenses 10–14 were made of polycarbonate, and lens 15 made of CR39. These test results establish the strength of the acrylic lenses of the invention making them safe for use as vision correction lenses.

The invention thus provides stress-relieved acrylic lenses which are strong enough for safe use as opthalmic lenses. The invention further provides at least two different methods of manufacturing stress-relieved acrylic lenses for opthalmic use for consistent high volume production, even in the high negative diopter range.

What is claimed as the invention is:

1. A method of molding a negative diopter stress-relieved ophthalmic lens out of acrylic resin material by an injection-coining mold process, the method comprising the steps of:

providing an injection molding machine having a mold clamp and a mold material injection screw, with a two plate fixed cavity mold having a movable half and a stationary half with at least one mold cavity defined between the movable half and stationary half, the mold cavity having varying thickness dimensions, with a center thickness less than a peripheral thickness, and an overflow area extending from the mold cavity, the movable mold half operatively controlled to exert variable clamping pressure against the stationary mold half, preparing the injection molding machine for operation with acrylic resin as a molding material by inputting predetermined molding process control parameters into a control system, the molding process control parameters being selected to avoid formation of stresses in the lens, the molding process control parameters including plastic temperature, plastic flow rate, plastic pressure, plastic cooling rate, clamp closing velocity, velocity-pressure changeover position and coining stroke, initiating the mold process by closing the mold halves together under a primary clamp pressure at a specified partial tonnage, advancing the injection screw to partially fill the mold and to reach a velocity-pressure change over position, at which a secondary clamp pressure is applied to the mold at a specified tonnage greater than the partial tonnage to perform a coining operation on the acrylic resin material in the mold, holding the injection screw under time and pressure, advancing the injection screw under the packing time and pressure, retracting the injection screw back to a metering ready position, allowing the acrylic resin material to solidify within the mold during a specified cooling time, opening a movable half of the mold to a stop point, and ejecting a stress-relieved acrylic lens out of the mold.

2. The method of claim 1 wherein the movable half or the mold exerts a coining stroke upon the acrylic resin material in the mold cavity when the secondary clamp pressure is applied to the mold.

3. The method of claim 1 wherein the primary clamp pressure is approximately 70–80% of the secondary clamp pressure.

4. The method of claim 1 wherein the velocity-pressure changeover position is reached when acrylic resin material occupies less than a total volume of the mold cavity.

5. The method of claim 1 wherein the mold cavity is filled to approximately 90% to 95% of a total volume of the mold cavity at the velocity-pressure changeover position.

6. The method of claim 1 wherein the size of the mold cavity changes according to movement of the movable half of the mold relative to the stationary half of the mold when the secondary clamp pressure is applied to the mold.

7. The method of claim 1 wherein the primary clamp pressure is applied to the mold for a period of time greater than the time for which the secondary clamp pressure is applied to the mold.

8. The method of claim 1 wherein the two plate mold has a mold cavity configured to form a vision correction lens with a negative diopter in the approximate range of −0.25 to −1.50.

9. The method of claim 1 wherein the predetermined process control parameters are selected from the group consisting of: high mold close velocity, clamp slow velocity, low mold close pressure, high mold close pressure, slow change position, high pressure change position, open/slow velocity, primary clamp pressure, primary clamp pressure time, secondary clamp pressure time, velocity-pressure changeover positions, high mold open velocity, primary open velocity, open stop position, slow distance, barrel temperatures, mold cooling water temperatures, injection time, cooling time, shot decompression, shot measuring distances, back pressure, and eject pressure.

10. The method of claim 1 wherein the two plate mold is a hot runner mold having a heated mold material manifold and nozzle.

11. The method of claim 1 wherein the mold cavity of the mold is configured to form a generally circular negative diopter ophthalmic lens in the approximate range of −0.25 to −1.50.

12. The method of claim 1 wherein the injection screw is held following partial filling of the mold and application of the secondary clamp pressure for an approximate period of time of 1.5 to 2.0 seconds.

13. The method of claim 1 wherein the injection screw is advanced under a packing time of approximately 1.5 to 2.0 seconds.

14. A method of making stress-relieved negative diopter ophthalmic lenses out of acrylic resin by injection-coining with a three-plate mold assembly in an injection molding machine having a mold clamp operative to apply variable pressures to the mold assembly, the three-plate mold assembly having a stationary plate/a movable plate/and a cavity plate and at least one mold cavity configured to form a negative diopter opthalmic lens having a center thickness dimension less than a peripheral thickness dimension, and a mold material injection screw operative to heat the acrylic resin and fill and pack a mold cavity in the mold assembly, the mold assembly having a mechanism operative to control a position of a cavity plate relative to a stationary plate of the mold assembly, the method comprising the steps of:

preparing the injection molding machine for operation with the three-plate mold assembly and acrylic resin by inputting control parameters into a control system for the injection molding machine, the control parameters including plastic temperature, plastic flow rate, plastic pressure, plastic cooling rate, clamp closing velocity, velocity-pressure changeover position, and degree of movement of the cavity plate relative to the stationary plate of the mold, opening a moveable plate of the mold assembly to an opening set point, extending the cavity plate to a position spaced from the stationary plate of the mold assembly;

applying a primary clamp pressure to the mold assembly;

partially filling the cavity within the mold assembly by operation of the injection screw to reach a velocity-pressure changeover position, at which a secondary clamp pressure to the movable plate of the mold assembly which is greater than the primary clamp pressure, the secondary clamp pressure, the secondary clamp pressure causing the cavity plate to collapse against the stationary plate of the mold assembly, holding the injection screw according to time and pressure control parameters, advancing the injection screw according to packing time and pressure control parameters, allowing the material in the mold cavity to solidify and cool, and moving the movable plate to open the mold assembly to allow ejection of a molded lens from the mold cavity.

15. The method of claim 14 wherein the primary clamp pressure is less than the secondary clamp pressure.

16. The method of claim 14 wherein the cavity plate is extended to a position spaced from the stationary plate of the mold assembly by a distance in the approximate range of 1.00 to 3.00 mm.

17. The method of claim 14 wherein the cavity plate remains at a position spaced from the stationary plate while the primary clamp pressure is applied to the mold assembly.

18. The method of claim 14 wherein the mold is partially filled while under the primary clamp pressure to the approximate range of 80% to 99% of the total mold cavity volume.

19. The method of claim 14 wherein the secondary clamp pressure is less than a maximum clamp pressure applicable to the mold assembly by the injection molding machine.

* * * * *